Oct. 9, 1923.
1,469,956
H. R. RICARDO
FUEL ADMISSION DEVICE FOR INTERNAL COMBUSTION ENGINES
Filed Nov. 22, 1919
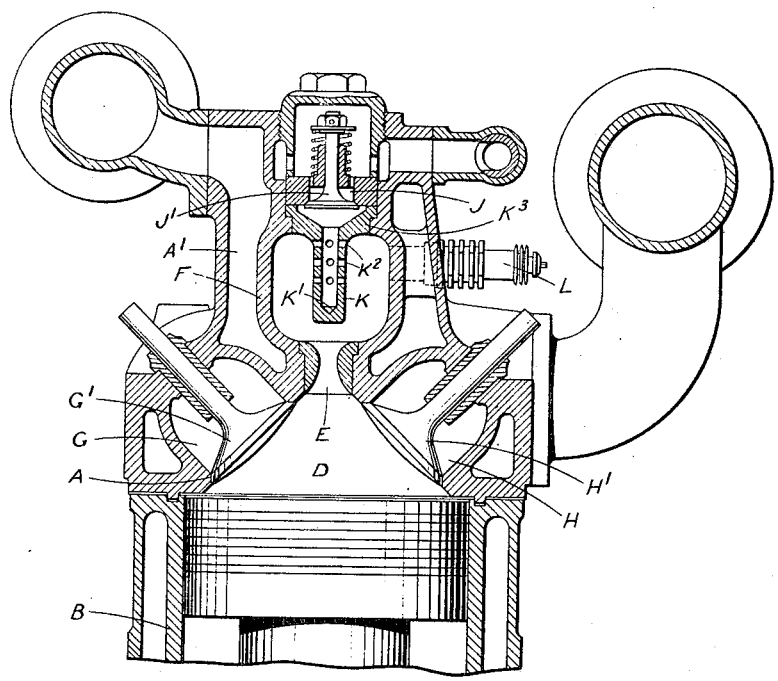
Inventor.
Harry R. Ricardo,
By Foster, Freeman, Watson & Coit,
Attorneys.

Patented Oct. 9, 1923.

1,469,956

UNITED STATES PATENT OFFICE.

HARRY RALPH RICARDO, OF LONDON, ENGLAND.

FUEL-ADMISSION DEVICE FOR INTERNAL-COMBUSTION ENGINES.

Application filed November 22, 1919. Serial No. 340,036.

*To all whom it may concern:*

Be it known that I, HARRY RALPH RICARDO, a subject of the King of England, and resident of London, England, have invented certain new and useful Improvements in Fuel-Admission Devices for Internal-Combustion Engines, of which the following is a specification.

This invention relates to internal combustion engines of the type described in the specification of the present inventor's United States Letters Patent No. 1,271,942 and has for its object to effect certain improvements in such engines.

In engines operating with a stratified charge in which the power output is controlled by the proportion of fuel admitted to the cylinder and in which a full charge of air is taken in, the flame temperature in the small bulb or compartment in which the inflammable portion of the charge is compressed and ignited is not subject to any very wide variation under varying loads also the density of the charge within this chamber remains constant under all loads. Advantage may be taken of these conditions to enable an engine operating on this cycle to utilize paraffin or other heavy hydrocarbons without preheating the air supply to the cylinder thus enabling a considerably heavier charge of air to be admitted at the same time reducing the mean temperature of the cycle.

According to this invention a tube with perforations in its wall and one end closed is fixed within the pocket or bulb with which the cylinder is provided the tube being arranged so that the fuel will pass first into it and thence through the openings in its wall into the pocket wherein it is ignited. The fuel inlet opening which is controlled by an automatic valve leads directly into the open end of the tube which is positioned centrally in the bulb.

In the preferred construction the bulb which is of small capacity has a narrow neck communicating with the cylinder combustion chamber and is fitted in such a manner that a flame issuing from the bulb will spread as freely as possible through the whole of the air contained in the combustion chamber without impinging against the cold walls of the chamber. This bulb has a capacity of from 10% to 25% of the volume of the clearance space and is preferably wholly or partially water-cooled. The combustible portion of the charge is admitted through a small automatic inlet valve fitted in the bulb while the main air charge is admitted through a mechanically operated inlet valve in the combustion chamber. The fuel and a certain very small portion of air are admitted without any preheating through the automatic inlet valve but before entering the bulb they pass through the vaporizing tube. This tube is exposed to the flame within the bulb from which it receives the heat necessary to evaporate the fuel. Since the flame temperature is nearly constant the temperature of the vaporizing tube remains approximately constant. With increase of load the temperature of the tube would tend to rise somewhat owing to the higher mean temperature of the cycle which has some, but only a slight influence upon the temperature within the bulb. Under these conditions, however, the quantity of liquid fuel passing through the tube is greater and the excess of heat imparted to the tube is utilized to overcome the latent heat of the fuel. In practice it is found that the vaporizing tube maintains an approximately uniform temperature under all conditions of load. The absolute temperature is controlled in part by the length of the tube and the surface exposed to combustion and in part by the rate at which it can dispose of its heat to the cooled portions of the bulb with which it is in metallic contact at its upper or open end. Owing to the fact that the vaporizing tube maintains an approximately uniform temperature at all loads, it is possible under all conditions of running thoroughly to vaporize the fuel without cracking it and causing deposits of carbon and without risk of premature ignition, while even running dead light and at the slowest speed the temperature is amply sufficient to cause complete vaporization.

The invention may be put into practice in various ways and applied to different types of engine. The accompanying drawing illustrates by way of example one construction that may be adopted the drawing showing in sectional elevation the head of the cylinder of an internal combustion engine.

The head A of the cylinder B is formed so as to provide a conical combustion space D at the apex of which is the constricted passage E leading from the pocket or bulb F. This bulb is cast in the head A with the water jacket A' carried around it and the inlet and exhaust ports G and H with their valves G' and H' are oppositely disposed in the conical part on either side of the passage E. In the construction illustrated the fuel inlet port J is arranged in the bulb F opposite to the delivery passage E and this port is provided with a spring controlled valve J'. The vaporizing tube K is closed at one end K' and in its wall are holes K². The open end of the tube is enlarged as at K³ and arranged so that the port J leads directly into this end of the tube and the tube itself lies centrally in the bulb F.

On the suction stroke of the piston fuel with a small quantity of air is at first drawn in through the port J and passes into the tube K and enters the bulb in a vaporized state through the perforations K² in the wall of the tube. Fuel ceases to be drawn in as soon as the main air inlet valve G' is lifted. Ignition is effected by a sparking plug L in the bulb F and the flame issues through the constricted passage E into the combustion space D.

The details of construction may be modified to meet requirements and the type of engine to which the invention is applied. In some cases where the engine cylinder is horizontal the communicating passage E is arranged at the side of the bulb while the fuel inlet port J is at the top and hence is not opposite to the passage E. The tube K is however directed downwardly from the port J. The combustion chamber D may be formed otherwise than as shown as for instance in the case of a horizontal engine.

What I claim as my invention and desire to secure by Letters Patent is:—

1. In an internal combustion engine the combination of a cylinder provided at its head with a pocket that communicates with the combustion chamber of the cylinder through a constricted passage, means for admitting fuel through an opening into the pocket, the pocket being entirely closed except for said fuel inlet and constricted outlet passage and a tube with perforations in its wall and one end closed and the other end fixed to the wall of the pocket so that the fuel will first pass into the tube and thence through the openings in its wall into the pocket as set forth.

2. In an internal combustion engine the combination of a cylinder provided at its head with a pocket that communicates with the combustion chamber of the cylinder through a constricted passage, means for admitting fuel into the pocket through an opening situated opposite to the constricted passage leading into the cylinder, the pocket being entirely closed except for said fuel inlet and constricted outlet passage and a tube with perforations in its wall and one end closed and the opposite end of which is secured to the wall of the pocket and over the fuel opening and with the closed end of the tube directed towards the constricted passage leading into the cylinder so that the fuel will first pass into the tube and thence through the openings in its wall into the pocket as set forth.

3. In an internal combustion engine the combination of a cylinder provided at its head with a pocket that communicates with the combustion chamber of the cylinder through a constricted passage, means for admitting fuel through an opening into the pocket, the pocket being entirely closed except for said fuel inlet and constricted outlet passage, a tube with perforations in its wall and one end closed which is fixed within the pocket so that the fuel will first pass into the tube and must pass through the openings in its wall to escape into the pocket, and means for igniting the fuel within the pocket as set forth.

4. In an internal combustion engine the combination of a cylinder provided at its head with a pocket that communicates with the combustion chamber of the cylinder through a constricted passage, an opening through which fuel can be delivered into the pocket, the pocket being entirely closed except for said fuel inlet and constricted outlet passage, a water jacket surrounding the pocket for cooling the same, a tube with perforated wall and one end closed fixed centrally within the pocket so that fuel from the opening will pass directly into the open end of the tube and thence through the openings in the wall thereof into the pocket, and means for igniting the fuel within the pocket as set forth.

5. In an internal combustion engine, the combination of a cylinder having at the closed end thereof a water-cooled combustion chamber comprising two portions of which one is fully open to the cylinder while the other and outer portion is formed as a pocket with a constricted communicating passage between it and the first part of the combustion chamber, valve controlled ports for the admission of air and the egress of exhaust products in the first part of the combustion chamber, a fuel admission port controlled by a suction actuated valve and situated behind an opening in the wall of the pocket portion of the combustion chamber directly opposite the constricted passage leading into the first portion of the combustion chamber, a tube with perforations in its wall having one end closed and the opposite end secured to the wall of the pocket around the fuel admission opening the tube being directed towards but terminating short of the constricted opening in the first portion of the combustion chamber, and means for igniting the fuel within the pocket as set forth.

In testimony whereof I have signed my name to this specification.

HARRY RALPH RICARDO.